United States Patent [19]

Nielsen et al.

[11] Patent Number: 5,754,324
[45] Date of Patent: May 19, 1998

[54] METHOD OF SETTING AN ELECTRO-OPTICAL SIGNAL PATH AND AN APPARATUS FOR CARRYING OUT THE METHOD

[75] Inventors: Tore Arme Nielsen, Måløv; Lars Bager Christensen, Gadstrup; Stig Højberg-Jensen, Strøby, all of Denmark

[73] Assignee: EMC Engineering & Marketing Consulting A/S, St. Heddinge, Denmark

[21] Appl. No.: 495,686

[22] PCT Filed: Jan. 24, 1994

[86] PCT No.: PCT/DK94/00042

§ 371 Date: Jul. 24, 1995

§ 102(e) Date: Jul. 24, 1995

[87] PCT Pub. No.: WO94/17430

PCT Pub. Date: Aug. 4, 1994

[30] Foreign Application Priority Data

Jan. 25, 1993 [DK] Denmark ................. 0083/93

[51] Int. Cl.$^6$ ............................. H04B 10/00
[52] U.S. Cl. ........................ 359/155; 359/154
[58] Field of Search .................... 359/142, 155, 359/154, 184; 250/221

[56] References Cited

U.S. PATENT DOCUMENTS 4,206,510  6/1980  Strait ........................ 367/94
5,126,555  6/1992  Hawryluk ................. 250/221

*Primary Examiner*—Kinfe-Michael Negash
*Attorney, Agent, or Firm*—Flehr Hohbach Test Albritton & Herbert LLP

[57] ABSTRACT

A method and apparatus for processing signals from light pulses for use in detecting the presence of objects that intrude between a light source and light receiver. Upon the receiver detecting light pulses emitted from the source, the emitted light pulses are modulated responsive to a modulation signal into an electro-optical signal path having successive periods. Each period has main, minimum and maximum pulses with the signal path providing a linear processing area having upper and lower amplitudes. Within the linear processing area an hysteresis range is set with upper and lower detection levels. Detection is disabled for those light pulses having amplitudes which are above or below the respective upper and lower detection levels. The linear processing area has an offset amplitude and the main pulse is controlled to have an amplitude which is a function of the offset amplitude.

7 Claims, 5 Drawing Sheets

FIG_1

FIG_2

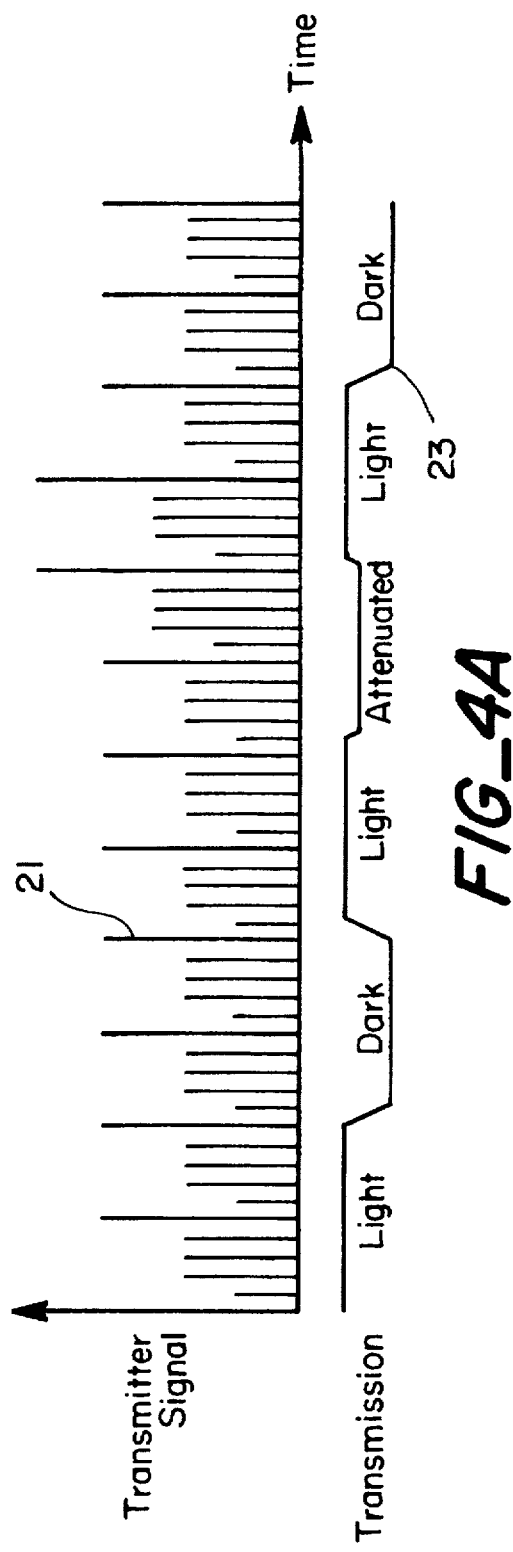
FIG_4A
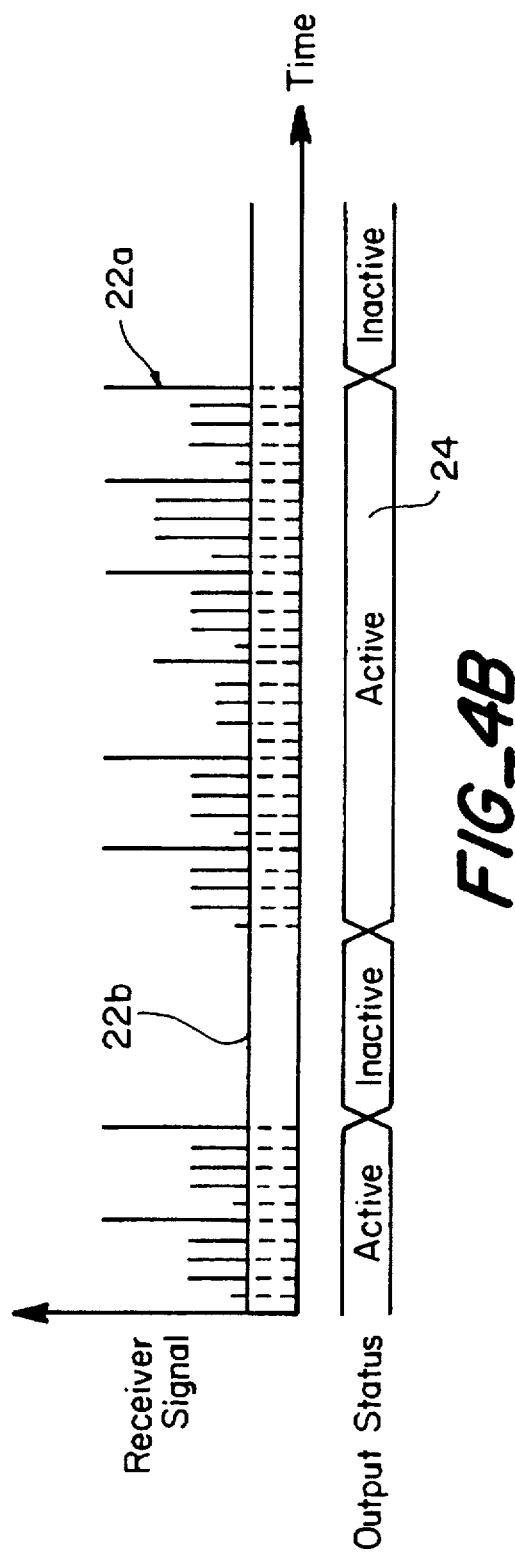
FIG_4B

METHOD OF SETTING AN ELECTRO-OPTICAL SIGNAL PATH AND AN APPARATUS FOR CARRYING OUT THE METHOD

TECHNICAL FIELD

The invention relates to a method for setting an electro-optical signal path and to an apparatus for carrying out said method.

BACKGROUND ART

A known method of this type is described in for instance "Lichtschranken" by M. Rascher and H. Klemmt, Dr. Alfred Huthig Verlag GmbH, 1987, and by this method a light source emits short light pulses with a fixed duty cycle and a fixed pulse intensity. A light-sensitive receiver is connected to a mean value generating circuit as well as to a single comparator circuit. A signal appears on the output of the comparator, said signal indicating whether the generated mean value exceeds or is lower than a set reference value applied on the reference input of the comparator. An interruption of the optical transmission between the light source and the light receiver causes a lower mean value which after the comparison with the fixed reference results in a change in the output signal on the comparator. This method is encumbered with several draw-backs. The establishing of several sets including a light source and a light receiver arranged close to one another may result in an error situation in which it is impossible to set a reference value, which in a reliable manner causes a signal change on the output of the comparator when the light source associated with the light receiver is interrupted. The remaining light sources take inadvertently part in setting a mean value which irrespective of the interruption of the light source in question prevents a signal change on the output of the comparator in question. When the reference value is set so close to the mean value applying to no interruption of the light sources that an interruption of the light source associated with the light receiver results exactly in a signal change, the light receiver becomes very sensitive to interruptions often occurring within the industry, such as electrical noise radiation, mechanical shakes of the light source as well as variations in the emitted light intensity of the light source caused by temperature variations and ageing of the components.

U.S. Pat. No. 5,126,555 describes an apparatus where the above error situation has been avoided by means of a synchronized receiver circuit ensuring that nothing but the pulse pattern emitted by the light source is recognized after reflection on an object in the so-called activation circuit of the light receiver. This is obtained by the emitted pulse/interruption pattern, such as in form of an EXCLUSIVE-OR gate, being recognized instead of generation of a simple mean value. As a result, foreign light sources emitting a continuous or pulse-shaped light intensity recognized on the light receiver can be distinguished from the light source of the apparatus, whereby a change encumbered with errors is avoided on the output. The light source remains interrupted until the error situation has ceased.

This apparatus is encumbered with the draw-back that it can be inactivated when exposed to a foreign light source. Another draw-back is found in the fact that the fixed light pulse intensity used in the apparatus does not immediately prevent an overload of the light-sensitive receiver or the succeeding mean value generating circuit, said overload appearing in connection with strongly reflecting objects. Finally, an essential draw-back of this apparatus is that it does not comprise means for adapting the pulse intensity of the light source to a use involving varying transmission conditions between the light source and the light receiver.

This draw-back has been overcome in an apparatus described in EP-PS No. 0.418.989, describing a photo-cell with a light source. The output power of this light source is automatically adapted to optionally appearing impurities on the light source or on the light receiver. The appearance of impurities may result in a gradual attenuation of the transmission therebetween. The advantage is obtained by means of a detection circuit connected to the light receiver. The detection circuit activates a coupling process ensuring that the light power is kept constant by the mean power of the light source being adjusted. As a result, the "penetration power" of the photo-cell is always the same in such a manner that it does not react gradually to semi-transparent objects and to a gradual attenuation of the light transmission between the light source and the light receiver. This apparatus is encumbered with the draw-back that several sets including their respective light source and light-sensitive receiver influence the individual setting thereof when they are mounted so close that a single light source can expose several receivers either by a direct radiation or by an unintentional reflection from objects or peripheries. Another draw-back is found in the fact that the apparatus uses pulses with the same intensity or the same duty cycle in principle. As a result, the light pulses received provide only insignificantly the light receiver with information on the transmission condition in question between light source and light receiver.

BRIEF DESCRIPTION OF THE INVENTION

The object of the present invention is to provide a method which allows recognition of the light source associated with each light-sensitive receiver in a system including several light sources and light-sensitive receivers, and which ensures that the light-sensitive receiver receives detailed information on the transmission conditions from the light source in a system including only a single light source and light-sensitive receiver so as always to ensure a linear processing area for the entire system.

In this manner the light pulses emitted through the modulation signal are provided with information-carrying amplitude signals. The informationcarrying signals are such that they can be used both for detecting the always available linear processing area for the electro-optical signal path and for ensuring that various closely arranged signal paths do not cause an error function of any signal path. It is advantageous as the minimum pulse to choose the substantially constant noise level or noise floor of the light receiver, i.e. the amplitude values being so high that they are only just recognized in the noise. It is advantageous as maximum pulse to choose the overload level of the light receiver because above this level the receiver loses the amplitude information and accordingly it is a waste of transmitter power to exceed this level. The first signal processing circuit receives these minimum and maximum pulses, respectively, and returns the result of this reception to the second signal processing circuit, which in turn processes the result for a setting of a linear processing area for the electro-optical signal path.

BRIEF DESCRIPTION OF THE DRAWINGS

The invention is explained in greater detail below with reference to the accompanying drawing, in which FIG. 4 illustrates a flow sheet of a signal path in the apparatus of FIG. 2 used for setting an electro-optical signal path when varying optical transmission conditions apply between light source and light receiver so as to ensure a linear processing area of the electro-optical signal path.

BEST MODE FOR CARRYING OUT THE INVENTION

Figure 1:
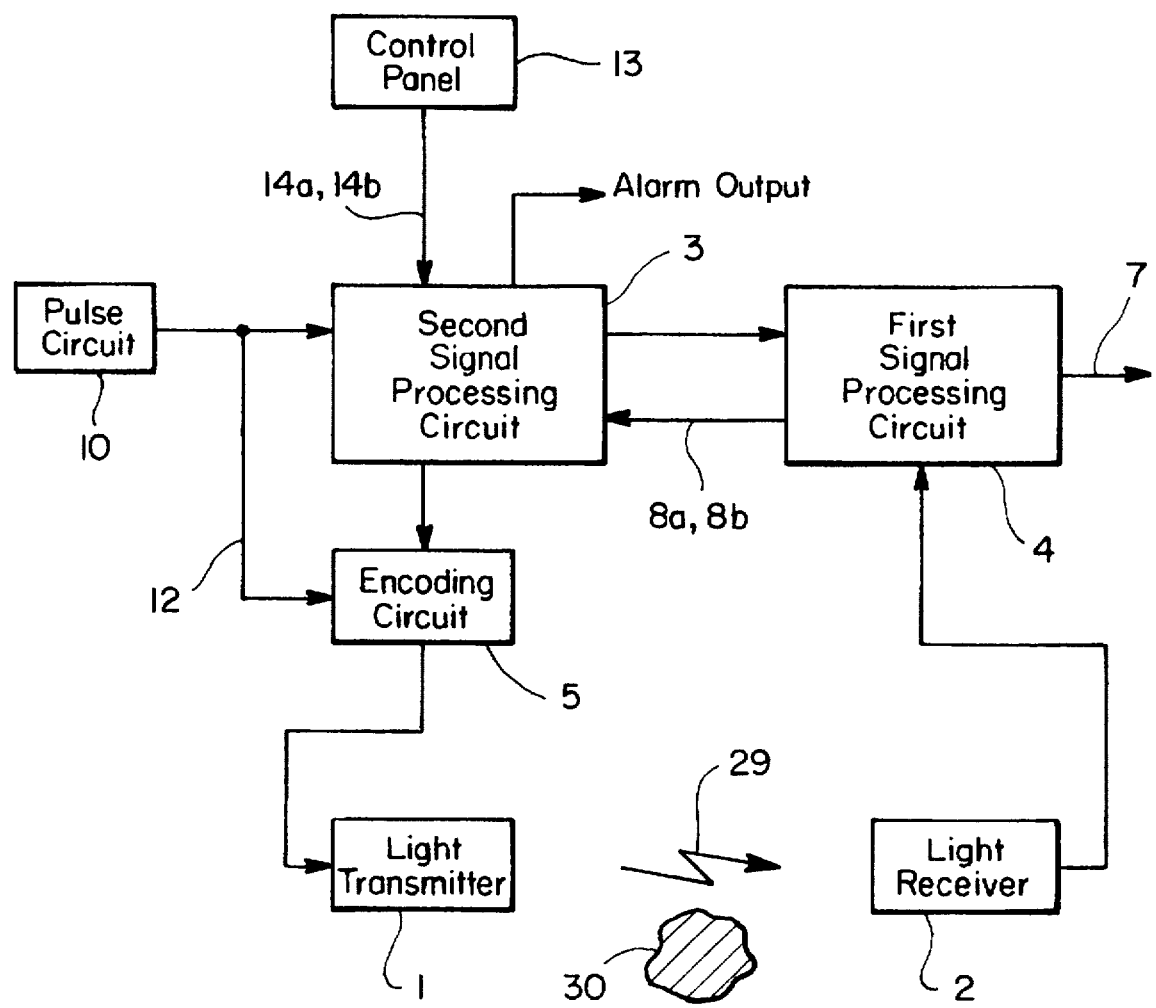
FIG. 1 illustrates a simple block diagram of an apparatus according to the invention.

The apparatus shown in FIG. 1 comprises a light source 1 and a light receiver 2 forming part of an electro-optical signal path. A first signal processing circuit 4 is connected to the light receiver 2 for a detection of the light emitted by the light source 1, said light being emitted in form of light pulses 29. A status change appears on a signal output 7 of the first signal processing circuit 4 when an object 30 causes a recognized interruption of the purely optical portion of the signal path. The light pulses 29 are controlled from a pulse circuit 10 determining the duty cycle and from an encoding circuit 5 setting the amplitude of each pulse in accordance with a modulation curve determined by a second signal processing circuit 3. The second signal processing circuit 3 is coupled to the first signal processing circuit 4. The modulated light pulses are set on the basis of signals 14a, 14b from a control panel 13, synchronizing pulses 12 from the pulse circuit 10, and signals 8a, 8b from the first signal processing circuit 4. The nature of these signals will now be explained in greater detail with reference to FIG. 2.

Figure 2:
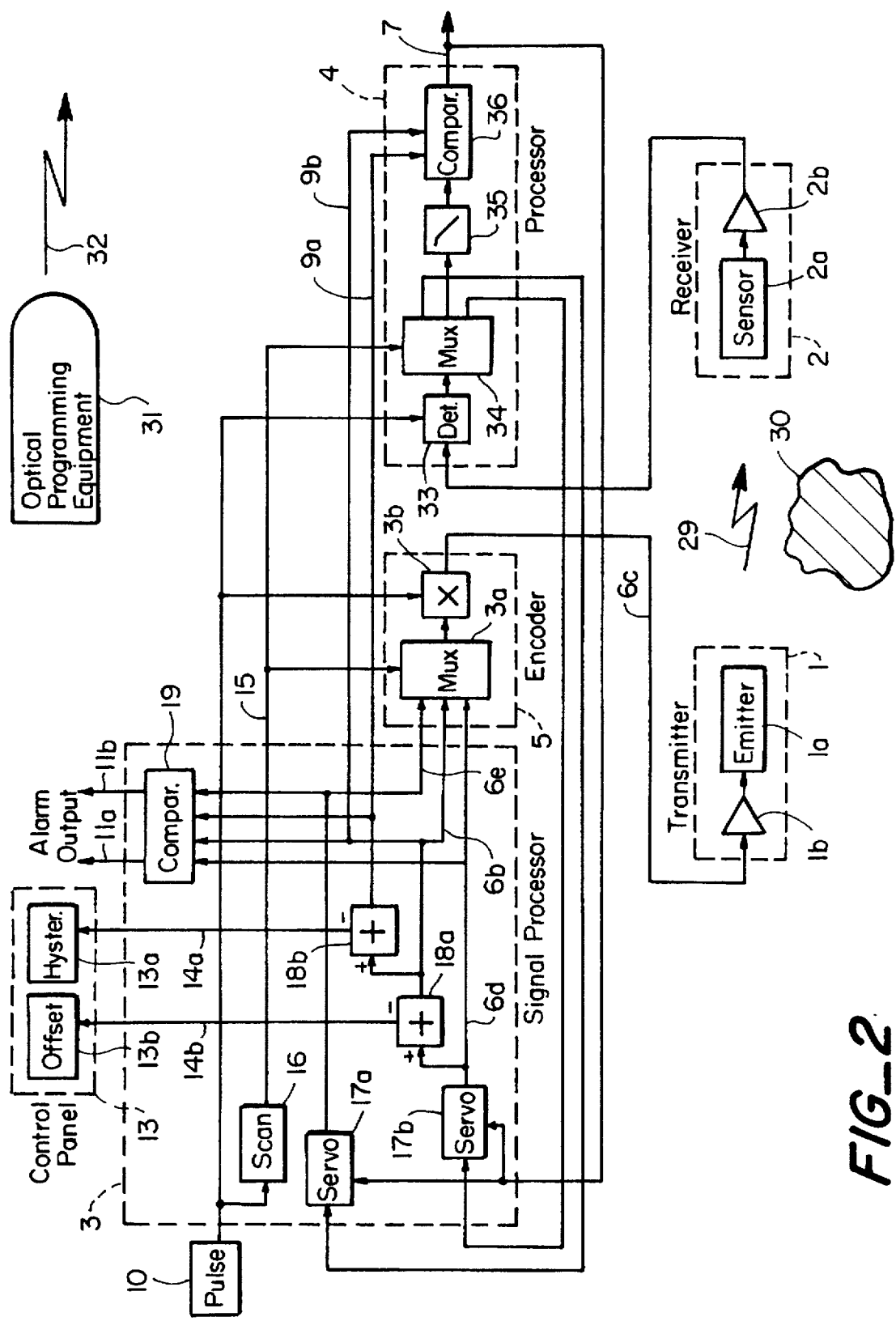
FIG. 2 illustrates a detailed block diagram of a preferred embodiment of the apparatus of FIG. 1.
Figure 3:
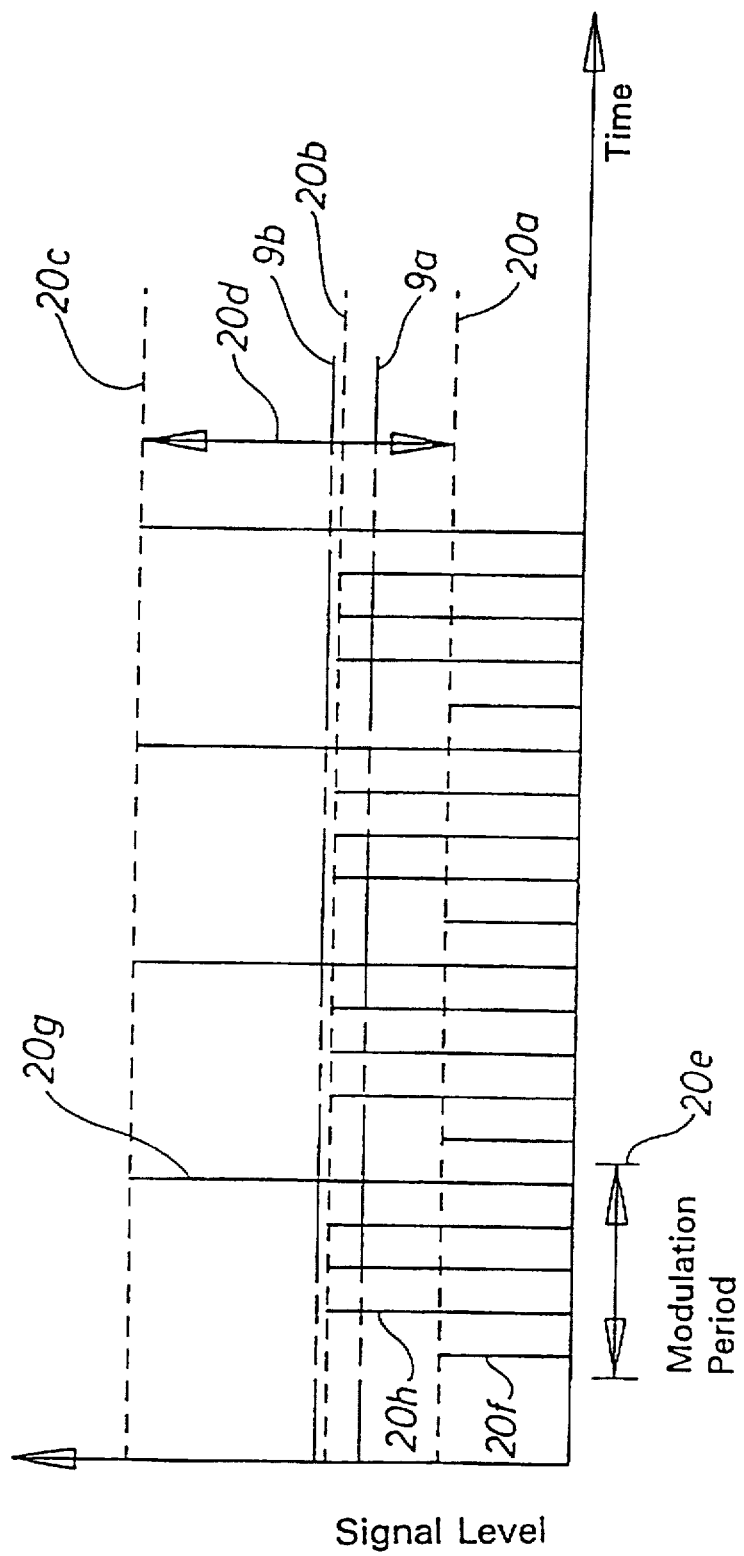
FIG. 3 illustrates a flow sheet of an embodiment of the modulated, emitted light pulses illustrated in form of a course of a curve of an electric signal from an encoding circuit in the apparatus according to the invention, shown over a specific period.

FIG. 2 shows the light source 1 in form of a light-emitting element 1a and an amplifier/driver circuit 1b, and the light receiver 2 is shown in form of a light-sensitive element 2a coupled to a low-noise preamplifier 2b. The encoding circuit 5 comprises a multiplier 3b introducing information into the generated pulse signal 12, said information being exemplified in form of three discrete amplitude values 6e, 6b, and 6d superimposed the pulse signal 12 in a 3-1 multiplexer 3a. The generated, modulated signal 6c is transmitted from the multiplier 3b to the light source 1, cf. FIG. 2. This signal has been shown in greater detail in FIG. 3. The modulation envelope is controlled by a scanner circuit 16 generating a change signal 15 for the multiplexer 3a. The three input signals 6e, 6b, and 6d to the multiplexer 3a result from signals from the first signal processing circuit 4 connected to the light receiver 2, viz. from the control signals 8a and 8b transmitted to two servo circuits 17a and 17b, respectively, in the second signal processing circuit 3. The servo circuits 17a and 17b maintain the level of the received minimum and maximum pulses 20f and 20g, respectively, in FIG. 3 in accordance with the signal levels 20a and 20c. The minimum pulses 20f enter the multiplexer 3a as the signal 6d and the maximum pulses 20g enter said multiplexer 3a as the signal 6e. The main signal 20h in FIG. 3 is generated as a pulse signal with an amplitude determined by an offset 14b relative to the minimum pulse 20f. This main signal 20h enters the multiplexer 3a as the signal 6b. The offset can be set by the user from a control panel 13 as a permanent offset 14b,. cf. FIG. 2. The detection of an object 30 in the optical signal path is performed by way of a window comparison of the received, mean value generated main signal 20h with two detection levels 9a and 9b, cf. FIG. 3.

If the received mean value generated signal is below the lower detection level 9a, the situation is recognized as the presence of an object 30 in the optical signal path. This situation releases a blocking or interruption of the two servos 17a og 17b through a control signal 7 from the signal output of the comparator, whereby the servos do not try to compensate for the presence of the object 30. In order to reactivate or open the servos 17a og 17b, the received mean value generated signal must exceed the upper detection level 9b. The difference between the lower and the upper detection level 9a and 9b, respectively, is called the hysteresis 14a of the signal path, and it is set from the control panel 13 by the user, said signal 14a from the control panel 13 being transmitted to the multiplexer 3a through the summation circuit 18b. An indication of a linear function of the electro-optical signal path is provided by means of a comparator 19 comparing the set detection levels 9a and 9b with the servo-set operation levels 6d and 6e. When it is tried to set an offset 14b or a hysteresis 14a from the control panel 13 which cannot be carried out with an actual operation condition for the light source 1 and the light receiver 2, a change appears on the outputs 11a and 11b of the comparator. Correspondingly, changed operation conditions, such as a smudging of the light source 1 or the light receiver, may result in the set values 14a and 14b can no longer be maintained within the linear area of the electro-optical signal path, and accordingly a change appears on the outputs of the comparator 19. These output signals 11a and 11b can furthermore be used together with a determining algorithm for controlling the circuits of the offset 13b and the hysteresis 13a. As an alternative these circuits can be controlled by an optical programming equipment 31 as outlined in FIG. 2 and emitting light pulses 32 which are received in the receiver 2. The emission of these light pulses 32 can for instance be delayed relative to the light pulses 29, and said light pulses 32 can be used for feeding the apparatus with information for controlling the circuits of the offset 13b and the hysteresis 13a.

The remaining components shown in FIG. 2 in the signal processing circuit 4 include a detector 33, a 1-3 multiplexer 34, a low-pass filter 35, and a comparator 36 with the signal output 7 detecting an object 30 and controlling the two servos 17a and 17b.

FIG. 3 illustrates an embodiment of a modulation envelope adapted to be used in an apparatus according to the invention and shown in the period where a portion of the received pulse signal is shown with a minimum pulse 20f a maximum pulse 20g, and three signal pulses 20h, all contained in the same modulation period 20e. Furthermore a noise level 20a as well as a saturation level 20c for the light receiver are indicated. The two detection levels 9a and 9b are placed between the two levels defining the limits of the linear processing area for the electro-optical signal path. The level 20b of the received main signal pulses 20h must be lower than the lower detection level 9a in order to be recognized as an interruption of the optical signal path, and after an interruption it must again exceed the upper detection level 9b in order to indicate that the interruption no longer applies. As mentioned previously, the difference between the lower and the upper detection level 9a and 9b, respectively is called the hysteresis 14a of the signal path, and it is set from the control panel 13 by the user.

An example of adjustment of the electro-optical signal path appears from FIG. 4 where the transmitted pulse signal 21 appears in the time interval, and where a varying transmission 23 in the optical signal path causes a received signal 22a, 22b with pulses 22a applying when the optical signal path is free and with a constant DC-level 22b representing the mean value of the noise when the optical signal path has been interrupted by an object 30. Furthermore the output status 24 of the signal output 7 is shown. A weak attenuation of the transmission in the optical signal path causes a reduced signal level on the light receiver with the effect that the minimum pulse does not exceed the noise level 20a of the receiver. The lack of pulse-recognition has the effect that the minimum servo 17b adjusts the signal up such that the minimum pulse is indeed recognized. Independent of the latter the maximum servo 17a adjusts the maximum pulse up such that it just loads the light receiver 2 correctly. When the transmission conditions are improved the received signal is increased in level, and the two servos 17a, 17b now adjust the emitted signal level downwards in such a manner that it is just correctly reproduced in the light receiver, i.e. none of the received pulses exceed the saturation level 2. The signal output 7 does not change its status when only a slight change applies to the transmission conditions, but only when an interruption caused by an object 30 in the optical signal path applies.

Figure 5A:
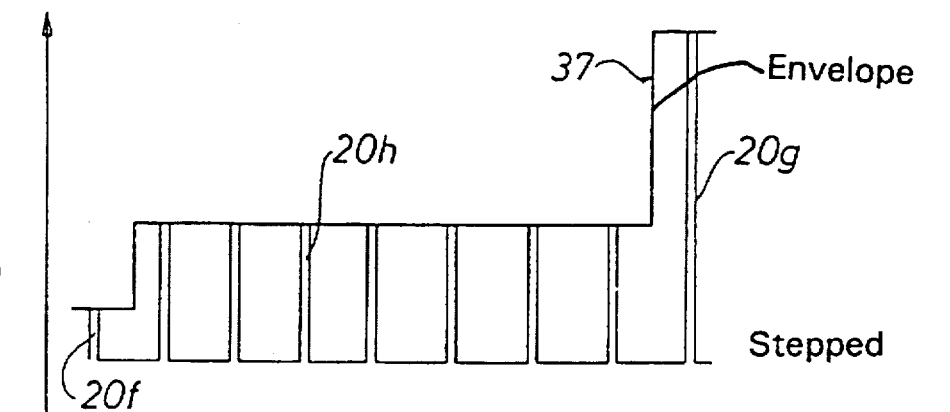
FIGS. 5a, 5b and 5c illustrate flow sheets of three embodiments of modulation signals or modulation envelope used for setting the electro-optical signal path.

FIG. 5a illustrates a modulation envelope 37 with an increased detection guarantee ensured by a large number of signal pulses 20h in each modulation period. This modulation envelope is to be used when the electro-optical signal path is used in an environment with relatively constant transmission conditions in the electro-optical signal path, and when heavy requirements are presented to the detection guarantee.

Figure 5B:
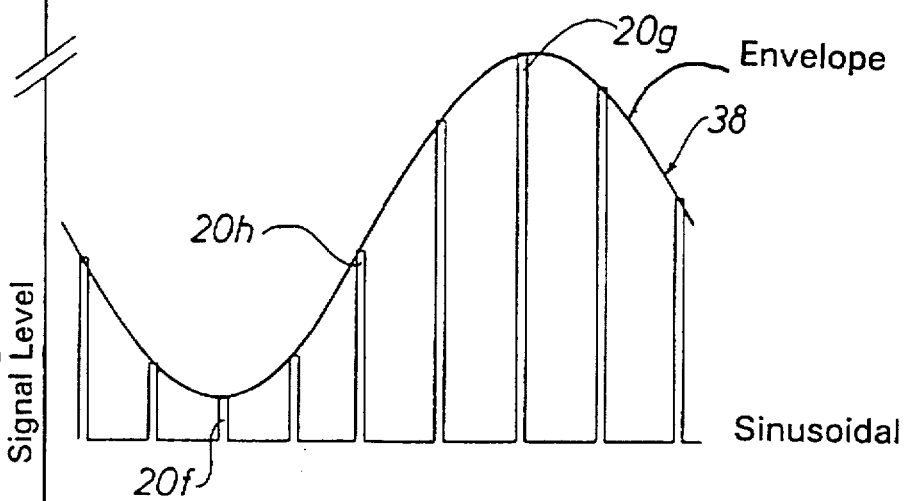

FIG. 5b illustrates a preferred modulation envelope 37, viz. a sinusoidal envelope to be used when several light sources can inadvertently be received on the same light receiver. In this manner a correct reception of the light source associated with the light receiver is ensured.

Figure 5C:
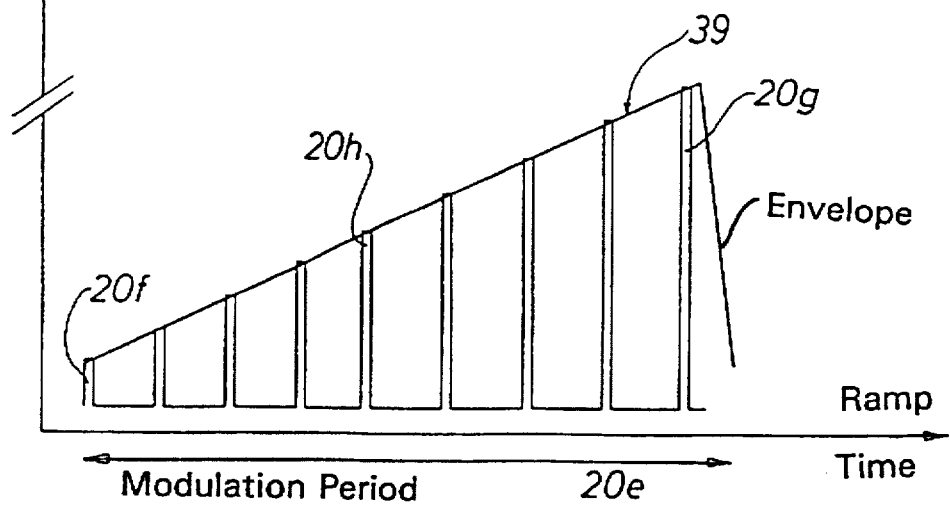

FIG. 5c illustrates a preferred modulation envelope 39 for determination of the linear processing area of an electro-optical signal path.

We claim:

1. Apparatus for use in setting an electro-optical signal path in a system which includes a light source emitting light pulses, a light receiver receiving said light pulses, a first signal processing circuit recognizing the light pulses and detecting the presence of an object between the light source and the light receiver when the level of the light pulses is reduced below a predetermined limit, preferably at interruption of said light pulses, the apparatus comprising: an encoding circuit (5) connected to the light source (1) the encoding circuit modulating the emitted light pulses (29) and generating at least one minimum pulse (20f) and at least one maximum pulse (20g), a second signal processing circuit (3) connected to the first signal processing circuit (4) the second signal processing circuit detecting the maximum pulse (20g) and the minimum pulse (20f), respectively, for setting a linear processing area (20d) for the electro-optical signal path, a control panel (13) having an offset circuit (14b) and an hysteresis control circuit (14a), said control panel (13) being connected to the second signal processing circuit (3) for setting said offset circuit or said hysteresis control circuit.

2. Apparatus as in claim 1 which includes detection level circuit means for establishing upper and lower detection levels, servo-set circuit means for establishing the first and second servo-set operation levels, comparator circuit means for comparing the upper and lower detection levels with the respective first and second servo-set operation levels and generating first and second output signals responsive to a predetermined comparison between the respective detection levels and servo-set operation levels, algorithm circuit means for generating an algorithm for automatically controlling offset and hysteresis of the signal path, and circuit means for controlling offset and hysteresis of the signal path responsive to the first and second output signals and also to the algorithm.

3. Apparatus for use in setting an electro-optical signal path in a system which includes a light source emitting light pulses, a light receiver receiving said light pulses, a first signal processing circuit recognizing the light pulses and detecting the presence of an object between the light source and the light receiver when the level of the light pulses is reduced below a predetermined limit, preferably at interruption of said light pulses, the apparatus comprising an encoding circuit (5) connected to the light source (1), the encoding circuit modulating the emitted light pulses (29) and generating at least one minimum pulse (20f) and at least one maximum pulse (20g), a second signal processing circuit (3) connected to the first signal processing circuit (4) the second signal processing circuit detecting the maximum pulse (20g) and the minimum pulse (20f), respectively, for setting a linear processing area (20d) for the electro-optical signal path, an offset circuit and a hysteresis circuit for controlling respective offset and hysteresis in the electro-optical signal path, and computer control means for sending information data, responsive to emission of the light pulses (32) to the light receiver (2) for controlling the offset (14b) and the hysteresis (14a) circuits.

4. A method of setting an electro-optical signal path in apparatus which includes a light source, a light receiver, and a first signal processing circuit which is adapted to recognize light pulses and detect the presence of an object between the light source and the light receiver when the level of the light pulses is reduced below a predetermined limit, the method comprising the steps of: emitting light pulses from a light source, detecting the emitted light pulses in the light receiver, generating from an encoding circuit a modulation signal, modulating the emitted light pulses responsive to the modulation signal into an electro-optical signal path having successive periods with each period having at least one main signal, at least one minimum pulse having a minimum amplitude and at least one maximum pulse having a maximum amplitude, setting in the electro-optical signal path a linear processing area having upper and lower amplitudes which are functions of the respective maximum and minimum amplitudes, setting within the linear processing area an hysteresis range having an upper detection level and a lower detection level, disabling the detecting step from detecting light pulses having amplitudes which are above or below the respective upper and lower detection levels, setting within the linear processing area an offset amplitude, and controlling the main signal to have an amplitude which is a function of the offset amplitude.

5. A method as in claim 4 and further comprising the steps of establishing first and second servo-set operation levels, comparing the upper and lower detection levels with the respective first and second servo-set operation levels and detecting any differences between the respective levels, generating a first output signal responsive to a detected difference between the upper detection level and the first servo-set operation level, generating a second output signal responsive to a detected difference between the lower detection level and the second servo-set operation level, establishing a determining algorithm, and controlling the settings of the hysteresis range and the offset amplitude as functions of the respective first and second output signals and of the determining automatic control algorithm.

6. A method of setting an electro-optical signal path in apparatus which includes a light source, a light receiver, and a first signal processing circuit which is adapted to recognize light pulses and detect the presence of an object between the light source and the light receiver when the level of the light pulses is reduced below a predetermined limit, the method comprising the steps of: emitting light pulses from a light source, detecting the emitted light pulses in the light receiver, generating from an encoding circuit a modulation signal, modulating the emitted light pulses responsive to the modulation signal into an electro-optical signal path having successive periods with each period having at least one main signal, at least one minimum pulse having a minimum amplitude and at least one maximum pulse having a maximum amplitude, setting in the electro-optical signal path a linear processing area having upper and lower amplitudes which are functions of the respective maximum and minimum amplitude, establishing first and second servo-set operation levels, providing a second signal processing circuit having a comparator, causing the comparator to compare the upper and lower detection levels with the respective first and second servo-set operation levels, detecting any differences between the respective levels, generating a first output signal responsive to a detected difference between the upper detection level and the first servo-set operation level, generating a second output signal responsive to a detected difference between the lower detection level and the second servo-set operation level, establishing a determining algorithm, and controlling the settings of the hysteresis range and the offset amplitude as functions of the respective first and second output signals and of the determining automatic control algorithm.

7. A method as in claim 6 and further including the step of selectively changing the determining algorithm for selectively changing the settings of the hysteresis range or of the offset amplitude.

* * * * *